(No Model.)
R. H. HASSLER.
ALTERNATING CURRENT MOTOR.
No. 534,151. Patented Feb. 12, 1895.
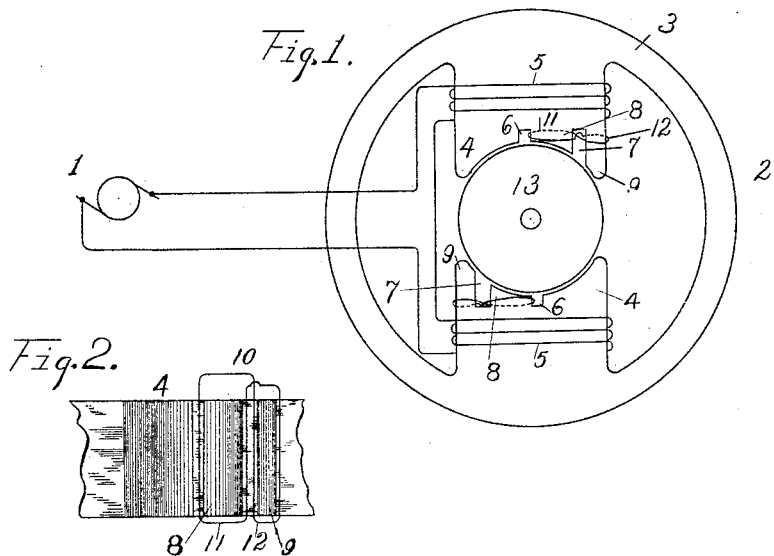
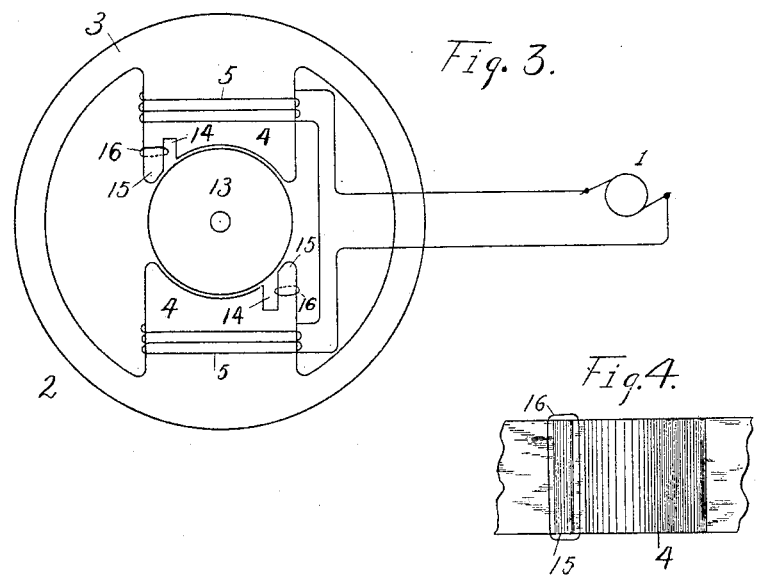
WITNESSES:
Ethan I. Dodds
Hubert C. Gener
INVENTOR,
Robert H. Hassler
BY Terry, MacKaye & Carr
ATTORNEYS.

UNITED STATES PATENT OFFICE.

ROBERT H. HASSLER, OF PITTSBURG, PENNSYLVANIA, ASSIGNOR TO THE WESTINGHOUSE ELECTRIC AND MANUFACTURING COMPANY, OF SAME PLACE.

ALTERNATING-CURRENT MOTOR.

SPECIFICATION forming part of Letters Patent No. 534,151, dated February 12, 1895.

Application filed November 30, 1894. Serial No. 530,374. (No model.)

*To all whom it may concern:*

Be it known that I, ROBERT H. HASSLER, a citizen of the United States, residing at Pittsburg, in the county of Allegheny and State of Pennsylvania, have invented a new and useful Improvement in Alternating-Current Electric Motors, (Case No. 619,) of which the following is a specification.

My invention relates to that class of electric motors which are operated by alternating currents, and more particularly to those which are intended to be used on single-phase circuits, and it has for its object to provide a method and a means whereby a motor of this character may be readily started from a state of rest without the application of any force other than the alternating current which actuates it after it reaches normal speed, and whereby the auxiliary electromotive force which produces the starting torque and serves to bring the motor to normal speed will be automatically and gradually reduced as the speed of the motor increases.

My invention pertains to that general class of motors known as induction motors which are constructed for use in both single-phase and multiphase circuits; but it is especially intended and adapted for use in single-phase circuits.

The well known disadvantages attendant upon the employment of single-phase induction motors is their inability to start from a state of rest without the application of some extraneous force, on account of the absence of the necessary starting torque. This disadvantage in connection with such motors has long been recognized and various methods have been proposed for overcoming the difficulty. One method which has been proposed involves the application of a closed coil to a portion of each pole-piece of the primary element of the motor, such coils being angularly displaced with reference to the main coils in circuit with the generator, and so located that induced electromotive forces will be set up therein and a shifting of the field of force thus effected which will serve to start the motor. This expedient is effective as a starting means, but the currents induced in these secondary or starting coils will continue to exist after the motor has attained its normal speed, and will interfere with the action of the motor and greatly reduce its efficiency. While it is possible to break the circuit of these starting coils after the motor has reached the desired speed by means of a switch, such an arrangement has many undesirable features, among which are the cost of the same and the attention required in operation. I propose to avoid these objectionable features of construction and operation by providing a starting coil which shall have a maximum electromotive force and therefore produce a maximum effect when the motor is at rest, and one in which such electromotive force will be gradually and automatically reduced as the speed of the motor increases until the motor attains its normal speed.

In motors of this class I find that a decided change occurs in the distribution of the magnetism of the poles as the speed of the armature changes. When the armature is at rest or running at a very slow speed the magnetic lines of force exist in much greater density at the extremities or tips of the poles than at the middle portions, but when the armature is running at normal speed the magnetism is more evenly distributed over the poles. I propose to take advantage of this phenomenon to accomplish the reduction of current in the starting coils and so reduce their harmful effect on the efficiency of the motor.

In the accompanying drawings are shown illustrative examples of the means employed for carrying my invention into effect, Figure 1 thereof being a diagram of a generator and a motor in circuit therewith, the latter being provided with a starting coil in accordance with my invention. Fig. 2 is a detail face view of one of the pole-pieces of the motor shown in Fig. 1, provided with the secondary starting coil. Fig. 3 is a diagram of a generator and motor embodying a modified form of my improvement. Fig. 4 is a detail face view of one of the pole pieces and starting coil of the motor shown in Fig. 3.

Reference being now had to Figs. 1 and 2 of said drawings, 1 is an alternating current single phase generator, and 2 is a motor, which, for convenience of illustration is shown as having a field-magnet, 3, provided with two pole-pieces, 4. Each of these pole-pieces has an energizing coil 5, thereon, these coils being connected in series with the generator and with each other. Each pole-piece is provided with two slots, 6 and 7, the latter being located nearer one side or edge of the pole-piece than the former. Two projections 8 and 9 are thus formed around which is placed a closed coil 10, consisting of two parts, 11 and 12, so connected that the electromotive forces induced in one part will be in opposition to those in the other. The location of these coils with reference to the main or primary coils, 6, is such that when the alternating currents are sent through the primary coils, currents will be induced in these secondary coils.

When the armature is stationary, the number of magnetic lines of force passing through the part 12 will be considerably in excess of those passing through the part 11, and the electromotive force generated in the former will, therefore, overcome that in the latter, so that a resultant electromotive force and current will be produced sufficient to cause the necessary starting torque upon the armature 13, which is provided with closed conductors of any well known form and arrangement. As the speed of the armature increases, the magnetic strength of the pole pieces will gradually become more evenly distributed until there are approximately as many lines of force threading the part 11 as the part 12, thus causing the electromotive forces in the two parts of each coil to be so nearly equal that the resulting current will not materially affect the action of the motor.

In Figs. 3 and 4 I have shown a modification which involves the employment of a simple closed coil in lieu of the double coil hereinbefore described. In this modification, each of the pole pieces of the field magnet is provided with a single slot 14, located near one of its extremities or tips, whereby a single projection 15 is formed in which the magnetism decreases as the speed of the armature increases. In this slot and around the adjacent projection is wound a closed coil 16, which will have a greater current when the armature is starting than when the latter is running at normal speed by reason of the change in the distribution of the magnetic lines of force above described.

While I have designated the stationary member of the motor as the field magnet and the movable member as the armature, I wish it to be understood that my invention is intended to include the reverse arrangement of the said parts as well.

I believe myself to be the first to provide a method and a means whereby an induced electromotive force, employed for starting an alternating current motor, is gradually and automatically reduced as the speed of the motor increases, and I desire it to be understood that my invention is not limited to any specific method or means for effecting this result.

I claim as my invention—

1. The method of starting an alternating current motor which consists in causing the current in the main primary coil to induce an electromotive force in an adjacent and relatively fixed closed conductor which decreases as the speed of the motor increases, substantially as described.

2. The method of starting alternating current induction motors which consists in subjecting the armature thereof to the combined inductive action of primary and secondary coils and decreasing the electromotive force in secondary coils as the speed of the movable member increases, substantially as described.

3. An alternating current motor the primary member of which is provided with primary coils in circuit with the generator and with secondary closed coils each of which has a portion of each turn located between the points of maximum and minimum magnetization caused by the primary coil when the secondary member is at rest, substantially as described.

4. The combination with a closed circuit armature, of a field magnet having symmetrically arranged primary coils in circuit with the generator and secondary closed coils each unsymmetrically placed with reference to each of said primary coils and comprising two reversely wound portions connected in series, whereby their resultant electromotive force decreases as the speed of the armature increases, substantially as described.

5. In an alternating current motor, the combination with a closed coil armature and a field magnet having its primary coils in circuit with a generator, of closed secondary coils in inductive relation to the primary coils, each comprising two reversely wound portions, one of which includes that portion of the magnetic field which is of maximum density when the armature is at rest, whereby a resultant electromotive force is produced in said coils which varies with the variations in the distribution of the magnetic lines of force in the field magnet, substantially as described.

6. An alternating current induction motor provided with primary inducing coils and with closed secondary coils, each secondary coil being composed of two parts wound in opposite directions, one of said parts being located at or near one side of the magnetic pole produced by the primary coil and the other part being located near the middle of said pole, substantially as described.

In testimony whereof I have hereunto subscribed my name this 27th day of November, A. D. 1894.

ROBERT H. HASSLER.

Witnesses:
HUGH M. SOUTHGATE,
JAMES WM. SMITH.